United States Patent
Bergman et al.

(10) Patent No.: US 8,272,412 B2
(45) Date of Patent: Sep. 25, 2012

(54) ELASTOMER COMPOSITION HAVING GLASS MICRO FIBERS

(75) Inventors: Brian R. Bergman, Clermont-Ferrand (FR); Jesse J. Arnold, Simpsonville, SC (US)

(73) Assignee: Michelin Recherche et Technique S.A. (CH)

( * ) Notice: Subject to any disclaimer, the term of this patent is extended or adjusted under 35 U.S.C. 154(b) by 687 days.

(21) Appl. No.: 12/359,533

(22) Filed: Jan. 26, 2009

(65) Prior Publication Data
US 2009/0133793 A1    May 28, 2009

Related U.S. Application Data

(63) Continuation of application No. PCT/US2006/034065, filed on Aug. 31, 2006.

(51) Int. Cl.
*B60C 11/00* (2006.01)
*B60C 1/00* (2006.01)

(52) U.S. Cl. .................. 152/209.1; 152/209.4; 152/458

(58) Field of Classification Search .................. 152/458, 152/209.1, 209.4
See application file for complete search history.

(56) References Cited

U.S. PATENT DOCUMENTS

| | | | |
|---|---|---|---|
| 3,763,912 A | 10/1973 | Bergomi et al. | |
| 4,014,835 A | 3/1977 | McCombs | |
| 4,026,744 A | 5/1977 | Elmer | |
| 4,042,742 A | 8/1977 | Bergomi | |
| 4,048,137 A | 9/1977 | Heitmann | |
| 5,225,457 A | 7/1993 | Borowczak et al. | |
| 5,526,859 A | 6/1996 | Saito et al. | |
| 5,591,279 A * | 1/1997 | Midorikawa et al. | 152/209.4 |
| 5,707,462 A | 1/1998 | Kikuchi et al. | |
| 6,022,434 A | 2/2000 | Willard, Jr. et al. | |
| 6,135,182 A | 10/2000 | Nagai | |
| 6,209,604 B1 | 4/2001 | Nishikawa et al. | |
| 6,575,215 B1 * | 6/2003 | Hino et al. | 152/209.4 |
| 6,631,748 B1 | 10/2003 | Nguyen et al. | |
| 6,637,397 B2 * | 10/2003 | Oare et al. | 152/526 |
| 7,044,181 B1 | 5/2006 | Uchida et al. | |
| 2001/0004911 A1 | 6/2001 | Iwamura | |

(Continued)

FOREIGN PATENT DOCUMENTS

EP    0 719 820 A1    7/1996
(Continued)

OTHER PUBLICATIONS

Machine translation of JP 2003-104013, 2003.*
(Continued)

*Primary Examiner* — Justin Fischer
(74) *Attorney, Agent, or Firm* — Frank J. Camppigotto (57) ABSTRACT

Elastomer compositions and products formed therefrom, the compositions including one or more elastomers and glass microfibers having an average fiber diameter of no more than about 5 µm and an average length of between about 5 and 200 µm, wherein the glass microfibers are directionally oriented within the elastomer composition. Alternatively, the average length of the glass microfibers may be between 5 and 100 µm or in other embodiments, between about 10 and 70 µm.

The elastomer compositions may be used to form products that include a tire tread or a support member within the sidewall of a tire. The glass microfibers may be oriented in, inter alia, a substantially circumferential orientation, a tread thickness orientation or at a 45° orientation in a plane formed between the tread thickness and circumferential orientations or in a sidewall thickness direction.

18 Claims, 3 Drawing Sheets

U.S. PATENT DOCUMENTS

2004/0035514 A1 2/2004 Kikuchi et al.
2004/0035515 A1 2/2004 Tsumori et al.

FOREIGN PATENT DOCUMENTS

| EP | 1310385 | * | 5/2011 |
|---|---|---|---|
| FR | 2824068 | * | 10/2002 |
| JP | 44-15895 | * | 7/1969 |
| JP | 2002-146109 | | 5/2002 |
| JP | 2004-34743 A | | 2/2004 |
| JP | 2003-104013 | * | 4/2011 |
| PA | J 62-191204 | | 8/1987 |
| PA | J 11-78420 | | 3/1999 |

OTHER PUBLICATIONS

Machine translation of FR 2824068, 2002.*

International Search Report and Written Opinion for PCT/US2006/34065 dated Dec. 18, 2006.

* cited by examiner

ELASTOMER COMPOSITION HAVING GLASS MICRO FIBERS

This application is a continuation of International Application No. PCT/US06/34065, filed Aug. 31, 2006.

BACKGROUND OF THE INVENTION

1. Field of the Invention

This invention relates generally to elastomeric compositions and more specifically, to elastomeric compositions containing oriented glass microfibers and products made therefrom.

2. Description of the Related Art

Efforts continue in the tire industry to improve tire performance, especially in such areas as rolling resistance, durability and the ability of a tire to operate in a run-flat mode over an extended distance. Materials that are used in the tire as well as the tire construction are both important factors in achieving such improvements in tire performance. The materials undergoing research in the tire industry include rubber compositions having glass fibers incorporated into the blend.

The addition of fibers into a rubber composition is well known. For example, in European Patent Application EP 0 719 820, published Jul. 3, 1996, a rubber composition was disclosed as being suitable for use in the tread of tires. The disclosed rubber composition reportedly provided excellent rolling characteristics, abrasion resistance, and improved dimensional stability and further did not undergo excessive shrinkage when extruded into rubber sheets for treads. The rubber composition included silica as a reinforcing material to provide the improved rolling characteristics and dimensional stability. Organic fibers, e.g., nylon, aramid, polyester, rayon or cotton, were added to the rubber composition to limit the shrinkage of the resulting extruded rubber sheets made from the disclosed composition.

In U.S. Patent Application No. 2004/0035515, published Feb. 26, 2004, a studless tire was disclosed having a tread with fibers oriented in the tread-depth direction. These fibers, which could be either organic or inorganic fibers, had a Mohs hardness of 3 to 7 because fibers with a Mohs hardness of less than 3 are softer than ice so that the road scratching effect is insufficient and fibers with a Mohs hardness of more than 7 becomes harder than asphalt causing the road to shave. Examples of such materials were disclosed having glass fibers with an average fiber diameter of 33 μm and of 200 μm.

In U.S. Pat. No. 4,048,137, issued Sep. 13, 1977, an elastomeric material was disclosed that was reinforced with short small diameter insulating glass fibers. The glass fibers were disclosed as being treated with a silane coupling agent and further having lengths of between 3 to 50 mm and diameters of between 0.5 and 3.8 μm, preferably between 2.5 and 3.8 μm. It was disclosed that such glass fibers provide excellent reinforcement to elastomers.

In U.S. Pat. No. 6,209,604, issued Apr. 3, 2001, a pneumatic tire for passenger vehicles was disclosed having at least one sheet of a rubber-filament fiber composite in the sidewall. The fibers useful for the invention were disclosed as being both inorganic and organic fibers having diameters of between 0.0001 and 0.1 mm and having a length greater than at least 8 mm. The elastomer was disclosed as being applied to the non-woven fiber fabric having a thickness of between 0.05 mm and 2.0 mm.

In U.S. Pat. No. 6,631,748, issued Oct. 14, 2003, a pneumatic passenger tire suitable for use under run-flat conditions is disclosed having a sidewall insert. The sidewall insert is disclosed as having short fibers within the insert to provide additional rigidity to the sidewall. Suitable fibers are disclosed as being organic fibers such as rayon, nylon, polyester or aramid. It is further disclosed that the fibers may be positioned radially or at a bias but specifically not placed in a circumferential orientation.

As with many properties associated with tires, the change of one material or construction of a tire to improve one physical characteristic of the tire often results in the decrease of other physical characteristics of the tire. What are needed are materials that improve at least one tire characteristic while still providing a favorable mix of other physical characteristics.

SUMMARY OF THE INVENTION

The present invention provides elastomer compositions and products formed from the elastomer compositions. In a particular embodiment of the elastomer composition, the composition includes an elastomer selected from one or more natural rubbers, one or more synthetic rubbers or combinations thereof and glass microfibers having an average fiber diameter of no more than about 5 μm and an average length of between about 5 and 200 μm, wherein the glass microfibers are directionally oriented within the elastomer composition. As known to those having ordinary skill in the art, microfibers may be directionally oriented in a rubber composition by processing the rubber composition containing the microfibers through and extrusion or calendering process. Fibers oriented through such a process are substantially oriented.

Embodiments of the present invention may include elastomer compositions having glass microfibers that are silane-modified or silane-pretreated.

In particular embodiments of the elastomer composition, the average length of the glass microfibers may be between 5 and 100 μm or in other embodiments, between about 10 and 70 μm. The glass loading may range between about 0.5 and 50 pounds per hundred of the elastomer (phr).

Embodiments of the present invention may include glass microfibers having an average diameter of between about 0.2 and 1 μm or even between about 0.3 and 0.8 μm.

Any of the elastomer compositions disclosed above or otherwise an embodiment of the present invention may be used to form a tire tread. Embodiments of the present invention that include a tread for a tire may include glass microfibers that are oriented substantially circumferentially or that are oriented substantially in a tread thickness orientation. Other embodiments may include glass microfibers that are oriented substantially 45° in a plane formed between the tread thickness and circumferential orientations.

Any of the elastomer composition disclosed above or otherwise an embodiment of the present invention may be used to form a support member within the sidewall of a tire. Embodiments of the present invention that include a support member within the sidewall of a tire may include microfibers that are oriented substantially circumferentially or in a sidewall thickness direction.

Of course the microfibers may be aligned substantially in any direction that would provide desired physical characteristics for any material, product or product component of the present invention.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

The present invention provides elastomer compositions and products made therefrom that surprisingly provide a combination of favorable rigidity, hysteresis and elongation properties. These properties are obtained by mixing very short (<200 μm) silane-pretreated glass microfibers into the elastomer composition at a loading of between 0.5 and 50 pounds per hundred pounds of elastomer (phr) in the composition. Importantly, the microfibers are substantially oriented unidirectionally to obtain the surprising combination of favorable rigidity, hysteresis and elongation properties. Advantageously, the orientation of the fibers provides an anisotropic material with improved rigidity in the direction of the fiber orientation but with little or no change in the physical properties in a direction orthogonal to the orientation direction. Surprisingly, even with the large increase in rigidity, the change in the hysteresis and elongation properties is relatively small by comparison, thereby providing the favorable mix of rigidity, hysteresis and elongation properties.

Suitable elastomers that may be used in the elastomer composition of the present invention include, for example, one or more natural rubbers, one or more synthetic rubbers or combinations thereof. Synthetic rubbers may include, without limitation, styrene-butadiene rubbers, nitrile-butadiene rubbers, butyl rubbers, polyisoprenes, polybutadienes and ethylene propylene terpolymers. The synthetic rubbers may include, but are not limited to, polymers, e.g., homopolymers, copolymers, and terpolymers, that are manufactured from 1, 3 butadiene, styrene, isoprene, isobutylene, 2,3-dimethyl-1,3 butadiene, acrylonitrile, ethylene, propylene, and the like.

Particular embodiments of the elastomer composition may include other components such as, for example, curing agents, reinforcing fillers, coupling agents, plasticizers, antiozonants, resins, various processing aids, oil extenders, antidegradants, antioxidants or combinations thereof as known to those having ordinary skill in the art. Curing agents that may be included in the elastomer composition include, for example, sulfur, sulfur donors, activators, accelerators, peroxides, and other systems used to effect vulcanization of the elastomer composition. Fillers may include, for example, carbon black, silica, clay and combinations thereof.

The glass microfibers that are included in the elastomer composition may be obtained either as a wool product, which is typically made up of fibers that are random in length, or as a chopped strand product, which is typically comprised of continuous strands chopped at fixed lengths. Either of these types of products is suitable for use in accordance with the present invention. It should be noted that during processing of the elastomer composition, the glass wool and the elastomer may be added to a banbury mixer for mixing, which breaks up the glass wool into suitable lengths of the microfibers. Suitable glass microfibers may be obtained from Lauscha Fiber International of Germany with manufacturing facilities in Summerville, S.C., under several different product names including, for example, B-04-F. While the glass chemical composition may vary for different applications, a suitable glass composition for the glass includes the "borosilicate" glass microfibers that are available from Lauscha Fiber International.

Suitable useful glass microfibers include, but are not limited to, those microfibers having an average diameter of less than about 5 μm. Particular embodiments of the present invention include glass microfibers in the elastomer composition that have an average fiber diameter less than about 4 μm and others less than about 3 μm. Other embodiments include glass microfibers having an average diameter of between about 0.1 μm and about 2 μm while other embodiments include fibers having an average fiber diameter of between about 0.2 and 1 μm. Other embodiments include glass microfibers having an average fiber diameter of between about 0.3 and about 0.8 μm.

Preferably, though not limiting the invention, the average length of the microfibers in the elastomer composition is less than about 200 μm. As the microfibers are mixed with the elastomer in the banbury mixer, the brittle glass microfibers are broken down to the desired length. Particular embodiments of the elastomer composition include microfibers having an average length of between about 5 and 200 μm while other embodiments include glass microfibers having an average length of between about 5 and 100 μm or of between about 10 and 70 μm. In particular embodiments of the present invention, the length to diameter (L/D) ratio of the glass microfibers may range between about 30 and 500 while in other embodiments, the L/D may range between about 50 and about 200.

Particular embodiments of the present invention include adding the glass microfibers to the elastomer composition at a loading of between about 0.5 and 50 pounds per hundred pounds of elastomer (phr). Other embodiments include loadings of between about 1 and 30 phr and others between about 2 and 20 phr.

Though not meant to limit the invention, it is thought that the very short glass microfibers included in the elastomer composition of the present invention provide the surprising results of a favorable mix of the physical properties of rigidity, hysteresis and elongation because the glass is brittle and avoids clumping in the elastomeric composition as is often the case with organic fibers. Furthermore, glass microfibers are easily treated with coupling agents to make the fibers bond with the elastomeric matrix. Using glass microfibers within the elastomer composition is further beneficial because the small diameter mitigates the penalizing effects of fiber in a composition, e.g., durability (fatigue) and wear resistance (cohesion).

While oriented microfibers of other materials will increase the rigidity of an elastomeric composition, these other materials trade off the gain in rigidity with significantly poorer elongation and/or hysteresis physical properties. This is true of other materials even when the other materials are formed into very short (<200 μm) lengths and added into elastomer compositions. It is the very short silane-treated glass microfibers that provide the surprising results of an elastomer composition having increased rigidity while maintaining a favorable mix of both elongation and hysteresis physical properties.

Treating the microfibers with a silane coupling agent is desirable to minimize the hysteresis of the elastomer composition. It is believed, but not meant to limit the invention, that providing improved bonding between the elastomer and the glass microfibers in the elastomer composition provides a lower hysteresis of the elastomer composition.

Pretreating glass fibers with a silane coupling agent is well-known to those having ordinary skill in the art. One or more coupling agents may be used in the elastomeric compositions of the present invention. The coupling agent may be a bifunctional organosilane cross-linking agent. By an "organosilane cross-linking agent" is meant any silane coupled filler and/or cross linking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane and the like, and mixtures thereof. In a preferred embodiment, the organosilane cross-linking agent is selected from the group consisting of bis-(3(triethoxysilyl)-propyl)-tetrasulfane (TESPT) (sold commercially as "Si69" by Degussa), gamma-mercaptopropyltrimethoxysilane (sold commercially as "Si189" by Degussa), and 3-thiocyanatopropyl-triethoxy silane (sold commercially as "Si264" by Degussa).

The process employed to pretreat the glass microfibers is neither sophisticated nor novel. The steps of the process include preparing a silane solution, dipping the microfibers into the solution, and then drying the fibers to remove the carrier solvent. In one procedure, a silane solution was prepared as a 5.8 wt. % solution of TESPT in ethanol. The fiber wool was treated by dipping the fibers in the solution. Good wet-out of the fibers was ensured by wringing the fiber wool, which removed air bubbles and forced the wet-out from the glass wool. The fibers were then dried at about 105° C.

As noted above, though not preferred, the coupling agent may be added to the banbury mixer with untreated glass microfibers to treat the fibers in situ during the mixing process. Such a process, as well as the pretreatment described above, provides silane-modified glass microfibers. Other methods for modifying the glass microfibers with silane may be known or devised by those having ordinary skill in the art. A preferred coupling agent suitable for such use and known to those having ordinary skill in the art is bis-(3(triethoxysilyl)-propyl)-tetrasulfane carried on N330 carbon black at a 1:1 ratio by weight. Optionally, any coupling agent such as those disclosed above may be added to the banbury mixer with the pretreated glass microfibers to treat the exposed untreated ends of the shattered microfibers.

The glass microfibers are oriented substantially unidirectionally to procure the surprising physical characteristics of the present invention. While any process may be used to orient the glass microfibers, known methods include orienting microfibers through an extrusion or calendering process. Calendering processes include those that utilize rollers to press the mixed elastomer composition into thin sheets or skims. Extrusion processes include those that utilize force to push the rubber composition through a die to form a shaped product.

Of these two types of processes, calendering provides superior orientation of the glass microfibers in a substantially unidirectional orientation. The anisotropic ratio, which is the ratio of a physical property, e.g., modulus, measured in the direction of the microfiber orientation to that measured orthogonally, provides a measurement of the degree of orientation of the fibers. For example, in one set of measurements of an elastomer composition in accordance with the present invention, the anisotropic ratio of the tensile moduli at 10% was 1.3 in an extruded sample and 1.7 in a calendered sample. The higher anisotropic ratio for the calendered sample evidences that the calendered material possesses superior orientation of the glass microfibers in a substantially unidirectional orientation when compared to the extruded material.

Figure 1A:
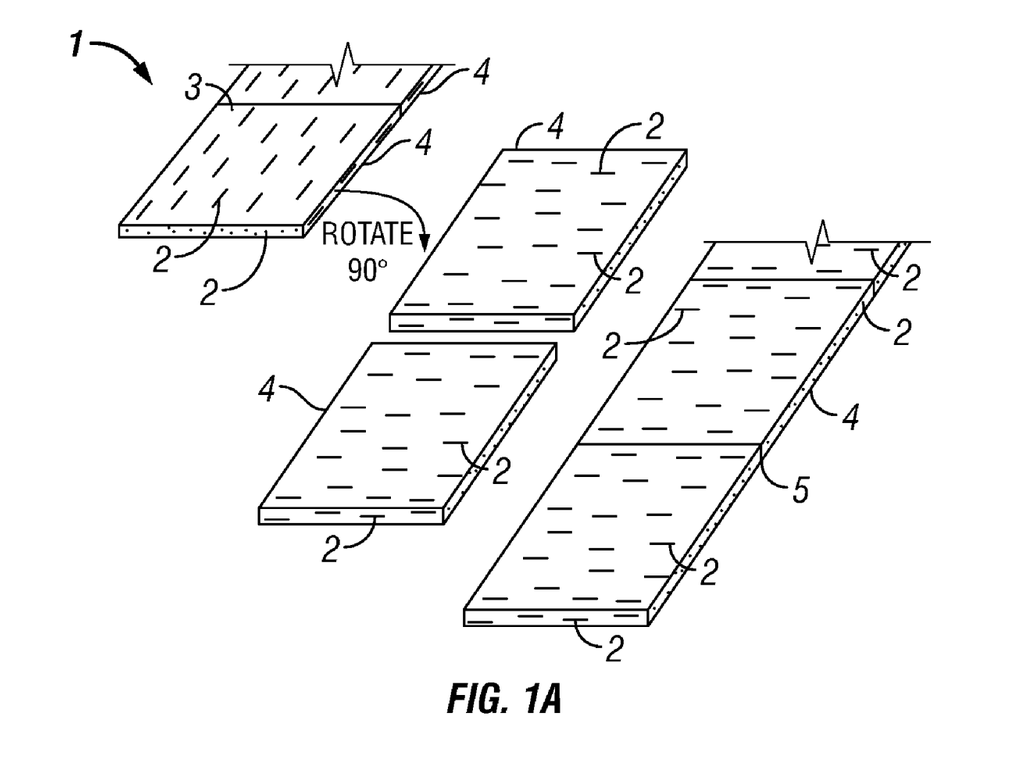
FIGS. 1A-1C are perspective views of calendered or extruded skims of a rubber composition that illustrate a method for orienting substantially unidirectionally the glass microfibers therein.
Figure 1B:
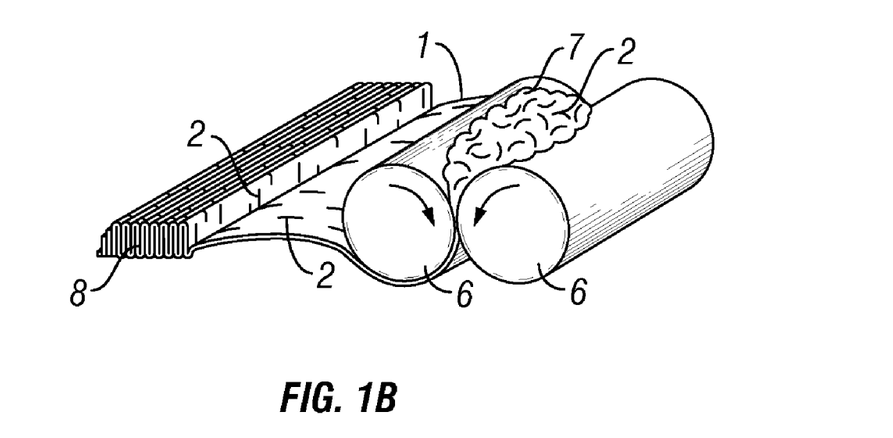
Figure 1C:
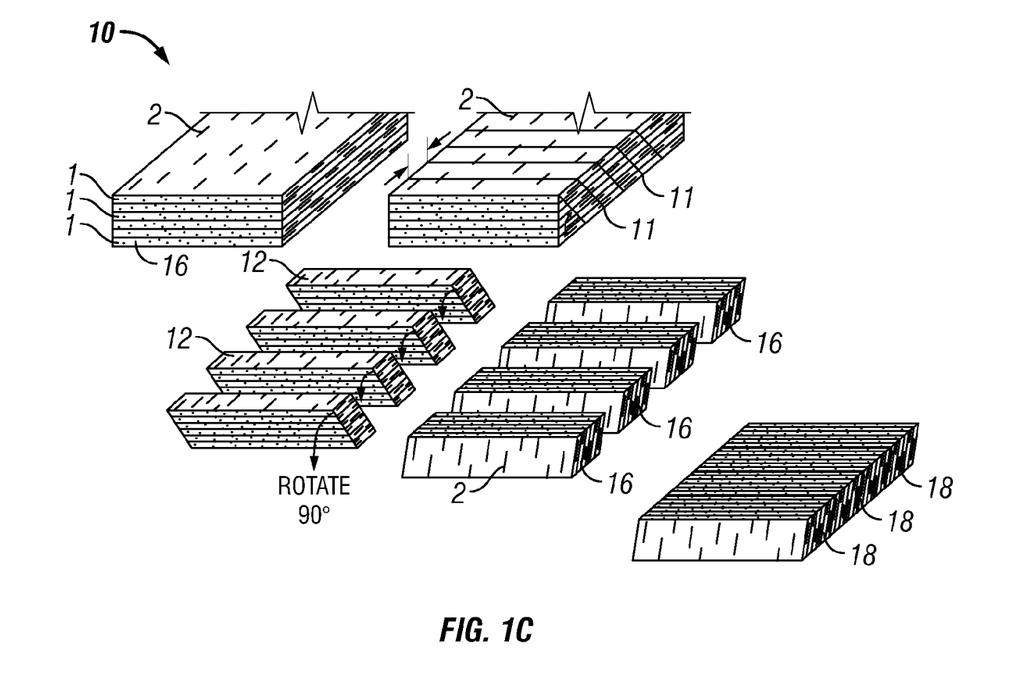

FIGS. 1A-1C are perspective views of calendered or extruded skims of a rubber composition that illustrate a method for orienting glass microfibers substantially unidirectionally therein. FIG. 1A illustrates orientation of the microfibers in the direction of the skim (X direction) or in the direction orthogonal to the X direction (Y direction). A skim 1 is produced through a roller process that substantially orients the glass microfibers 2 in the X direction. If a skim is desired having glass microfibers substantially oriented in the X direction, then the process is complete at this point. However, if the glass microfibers are to be oriented in the Y direction, then the skim 1 is cut 3 into sections 4 that are then rotated 90 degrees so that the glass microfibers 2 are substantially oriented in the Y direction. The sections 4 may then be bonded together at a seam 5. A plurality of skims 1 may be stacked (not shown) to provide a desired thickness of elastomer composition having glass microfibers oriented unidirectionally. Each skim may be of any desired thickness but the thinner the skim, the better the unidirectional orientation of the glass microfibers.

FIG. 1B illustrates orientation of the glass microfibers in a generally Z direction, which is a direction orthogonal to both the X and Y directions shown in FIG. 1A. The rollers 6 on the calendar produce the calendered skim 1 from the elastomeric composition 2 fed into the rollers 6. The glass microfibers 2 are aligned, as shown in FIG. 1A, in the X direction as the skim is produced off the rollers 6. However, by repeatedly folding 8 the calendered skim 1, the glass microfibers 2 are aligned in the Z direction.

FIG. 1C illustrates orientation of glass microfibers in a generally 45° orientation from the calendered or extruded direction X. A stack 10 of calendered skims 1 is cut 11 at a 45° angle. Each of the cut sections 12 are separated and then rotated 90 degrees. The rotated sections 16 then have the microfibers 2 contained therein substantially oriented unidirectionally at 45°. The sections 16 may then bonded together at a seam 18.

The elastomer composition disclosed herein may be used for various elastomeric products such as a tread compound, undertread compound, sidewall compound, wire skim compound, inner liner compound, bead, apex, any compound used in a tire carcass and other components for vehicle tires, industrial rubber products, seals, timing belts, power transmission belting, and other rubber goods. As such, the present invention includes products made from the elastomer composition disclosed herein. The elastomer composition of the present invention would be especially beneficial for those applications requiring materials with higher rigidity while maintaining favorable hysteresis and elongation physical properties.

Particular embodiments of the present invention include tire treads for vehicle tires. Particular embodiments of the present invention include treads for both passenger and truck tires. These treads are formed of the elastomer composition having the very short silane-pretreated glass microfibers that are oriented substantially unidirectionally within the composition. The treads may be bonded or otherwise made an integral part of the vehicle tire by methods known by those having ordinary skill in the art and such methods or processes are not a part of the present invention.

Orienting the glass microfibers substantially unidirectionally in the tread greatly improves the rigidity of the tread while, surprisingly, having a minimum impact on hysteresis, thereby decreasing the rolling resistance of the tire and retaining acceptable endurance properties.

Figure 2:
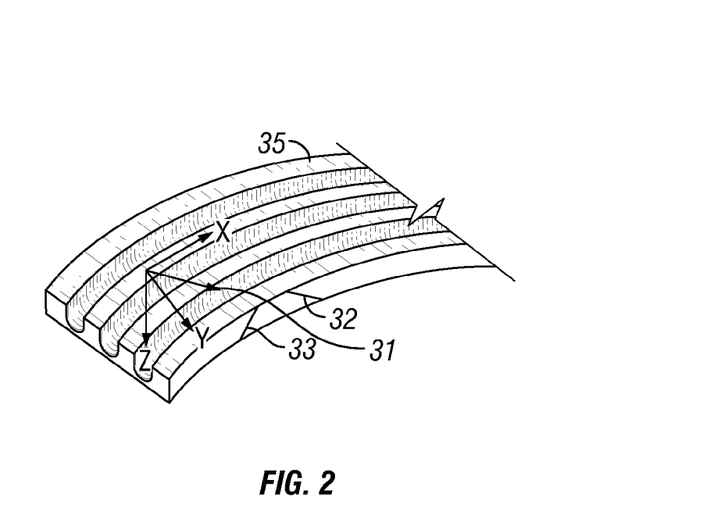
FIG. 2 is a perspective view of a tread for a vehicle tire illustrating the coordinate system for orienting the microfibers therein.

The direction of the fiber orientation influences the physical properties of a tire tread of the present invention. FIG. 2 is a perspective view of a tread for a vehicle illustrating the coordinate system for orienting the microfibers in the tread. Microfibers oriented in the X direction are oriented circumferentially around the tire tread 35. Microfibers oriented in the thickness direction of the tread 35 are oriented in the radial, or Z direction. Microfibers oriented orthogonally to both the X direction and the Z direction are oriented in the lateral, or Y direction, across the tread from side to side. As noted in FIG. 2, the microfibers may also be oriented in a +45° 33 or a −45° 32 orientation in the X-Z plane. Additionally, the microfibers may be oriented in a 45° 31 orientation in the X-Y plane. Of course, any desired orientation of the fibers may be achieved and the invention is not meant to be limited only to those fiber orientations illustrated in FIG. 2.

As noted above, the direction of the orientation of the glass microfibers impacts the physical characteristics of a tread made in accordance to the present invention. While the preferred orientation of the fibers may depend on a particular application or method of making or assembling a final product, in particular embodiments of a tire tread according to the present invention, orienting the microfibers in the tread thickness direction provides the greatest improvements in the rolling resistance while microfibers arranged in the +45° orientation provide the greatest wear resistance.

Particular embodiments of the present invention further include sidewall supports for vehicle tires, especially for those tires that are suitable for run-flat operation. As known to those having ordinary skill in the art, run-flat tires are designed to operate for a suitable distance after loss of normal inflation pressure. Sidewall supports are formed of the elastomer composition having the silane-pretreated glass microfibers that are oriented substantially. The supports are made a part of the sidewall by tire building methods known to those having ordinary skill in the art and such methods or processes are not a part of the present invention.

Figure 3:
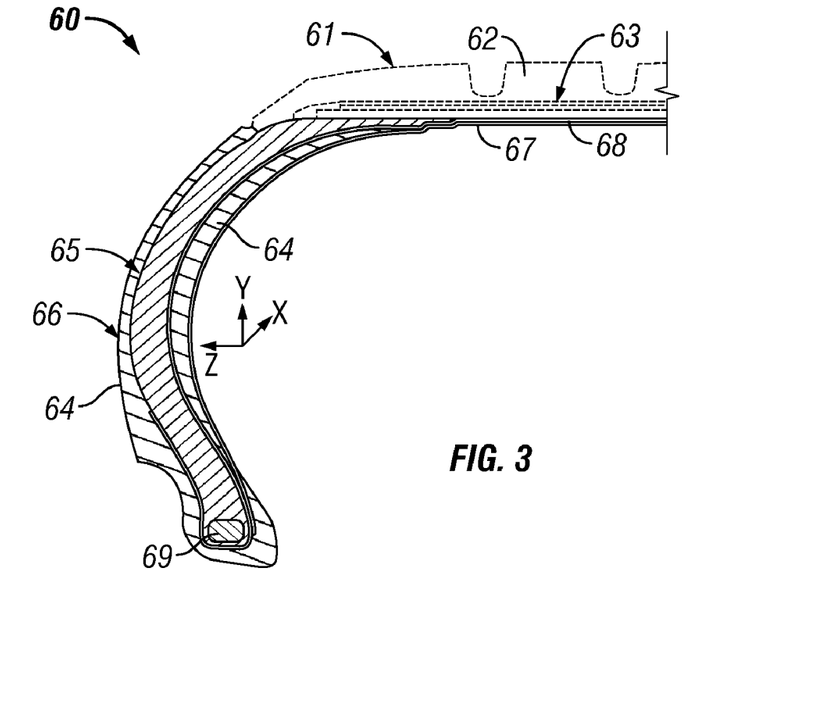
FIG. 3 is a cross-sectional view of one-half of an uncured run-flat tire illustrating the coordinate system for orienting the microfibers in the sidewall according to the present invention.

FIG. 3 is a cross-sectional view of one-half of an uncured run-flat tire having a sidewall support in accordance with the present invention. The run-flat tire 60 includes a crown portion 61 with a tread 62 and a tread reinforcing package 63. The run-flat tire 60 further includes a sidewall 70 having a crescent shaped reinforcing member 64 with a supportive complex 65 and a protective complex 66. An inner liner 67 and tire carcass 68 wrapped around a bead core 69 are also included as typical in a pneumatic vehicle tire. Microfibers may be oriented in the support sections of the sidewall 64 such as, for example, the crescent shaped reinforcing member 64. Microfibers oriented circumferentially around the sidewall 64 of the tire 60 are oriented in the X direction. Microfibers oriented in a sidewall thickness direction are oriented in the Z direction. Microfibers oriented orthogonally to both the X direction and the Z direction are oriented in the Y direction. Of course, any desired orientation of the fibers may be achieved and the invention is not meant to be limited only to those fiber orientations illustrated in FIG. 3A.

Figure 4:
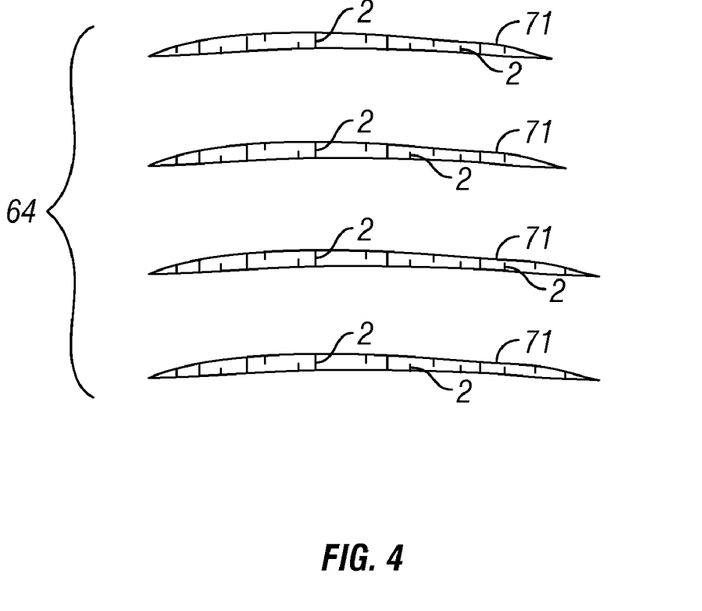
FIG. 4 is a cross-sectional view of skims used to produce a crescent shaped reinforcing member that is part of a sidewall of a tire.

FIG. 4 is a cross-sectional view of skims used to produce a crescent shaped reinforcing member 64 that is part of a sidewall of a tire. In this particular embodiment, the skims 71 are produced by the calendering process shown in FIGS. 1A-1C so that the fibers 2 are aligned in the thickness direction of the crescent shaped reinforcing member 64. The skims 71 are stacked during the assembly process to form the reinforcing member 64. When the reinforcing member 64 is made a part of the sidewall 64, the reinforcing member 64 assumes the shape of the sidewall 64, as shown in FIG. 3A. Changing the shape of the reinforcing member 64 to the shape of the sidewall 64 changes the apparent orientation of the fibers 2 relative to the sidewall 64 although the microfibers 2 remain substantially orthogonal to the base 72 of each of the skims 71 making up the reinforcing member 64.

The physical characteristics of the elastomer composition of the present invention provide the benefits that are sought in run-flat tire applications. Because a run-flat tire must operate over a significant distance in a non-inflated state while still providing support for a vehicle, rigidity and hysteresis properties of the materials making up the sidewall are critical. Rigidity is required to provide the needed support for the vehicle or load on the tire and low hysteresis is needed to minimize heat buildup in the tire during run-flat operation. Surprisingly, a sidewall comprising the elastomer composition of the present invention provides the desired mix of rigidity, hysteresis and tensile strength/elongation physical properties.

The invention is further illustrated by the following examples, which are to be regarded only as illustrations and not delimitative of the invention in any way. The properties of the compositions disclosed in the examples are evaluated as described below.

Moduli of elongation (MPa) are measured at 10% and at 100% at a temperature of 23° C. in accordance with ASTM Standard D412 on ASTM C test pieces. These measurements are true secant moduli in MPa, that is to say the secant moduli calculated reduced to the real cross-section of the test piece at the given elongation.

Hysteresis losses (HL) are measured in percent by rebound at 60° C. at the sixth impact in accordance with the following equation:

$HL\ (\%) = 100(W_0 - W_1)/W_1,$ where $W_0$ is the energy supplied and $W_1$ is the energy restored.

The elongation property is measured as elongation at break (%), which is measured at 23° C. in accordance with ASTM Standard D412 on ASTM C test pieces.

EXAMPLE 1

This example compares physical properties of exemplary elastomer compositions having glass microfibers with other elastomer compositions having microfibers made of other materials, namely, carbon microfibers and KEVLAR pulp microfibers. The properties of these fibers are shown in Table 1. The KEVLAR pulp is available from Dupont, the glass microfibers from Lauscha Fiber International and the PYROGRAF carbon fibers from Pyrograph Products, Inc. of Cedarville, Ohio. It should be noted that all of the fibers tested were microfibers having an average diameter of no more than 5 μm and an average length of no more than 50 μm.

TABLE 1

Microfiber Properties

| Fiber | Diameter, μm | Length, μm | L/D | Surface Area, m²/g |
|---|---|---|---|---|
| Glass, B-00-F | 0.32 | <50 | <600 | 4.95 |
| Glass, B-04-F | 0.45 | | <400 | 3-4 |
| Glass, B-50-R | 5 | | <40 | 0.32 |
| KEVLAR Pulp | <3 | <5 | >3 | 8 |
| Carbon PYROGRAF III | 0.1-0.2 | <100 | <1000 | 10-30 |

Elastomer formulations were prepared by mixing the components given in Table 2, except for the sulfur and the curing agents, in a banbury mixer operating at 55-65 RPM until a temperature of between 155 and 170° C. was reached. The sulfur and curing agents were then added on a roll mill. Vulcanization was effected at 150° C. for 25 minutes. The formulations were then tested to measure their physical properties.

The compositions of the formulations are shown in Table 2 as the weight percent of elastomer content. Each of the formulations included a mixture of natural rubber and butadiene rubber. The materials listed as "other" included antioxidants, antiozonants, plasticizers, sulfur and curing agents such as accelerators, retarders and activators as known to those having ordinary skill in the art. The silane coupling agent bis-(3 (triethoxysilyl)-propyl)-tetrasulfane (TESPT) was added to some of the compositions having the glass microfibers. Table 2 further provides the results of the analyses of the physical properties of the formulation.

TABLE 2

Physical Properties of Elastomers Having Different Fiber Types (Normalized)

| | Glass, 0.4 μm | | | | | Glass 5 μm | | Carbon | | | KEVLAR | | |
|---|---|---|---|---|---|---|---|---|---|---|---|---|---|
| Fiber Loading | 0 | 5 | 10 | 10 | 10PT | 10 | 20 | 0 | 10 | 15.7 | 0 | 2 | 3 |
| Natural Rubber | 80 | 80 | 80 | 80 | 80 | 80 | 80 | 80 | 80 | 80 | 50 | 50 | 50 |
| Butadiene Rubber | 20 | 20 | 20 | 20 | 20 | 20 | 20 | 20 | 20 | 20 | 50 | 50 | 50 |
| Carbon Black | 35 | 35 | 35 | 35 | 35 | 35 | 35 | 39 | 39 | 39 | 55 | 55 | 55 |
| TESPT | 1 | | | 0.5 | 0.5 | 0.5 | 1 | | | | | | |
| Other | 12 | 12 | 12 | 12 | 12 | 12 | 12 | 20 | 20 | 20 | 32 | 32 | 32 |
| Modulus 10% X | 100 | 138 | 166 | 191 | 175 | 150 | 184 | 100 | 215 | 275 | 100 | 152 | 248 |
| Modulus 10% Y | 97 | 106 | 106 | 113 | 113 | 106 | 119 | 96 | 132 | 158 | 103 | 126 | 132 |
| Anis X/Y | 1.0 | 1.3 | 1.6 | 1.7 | 1.6 | 1.4 | 1.6 | 1.0 | 1.6 | 1.7 | 1.0 | 1.2 | 1.9 |
| HL X | 100 | 146 | 166 | 146 | 117 | 127 | 131 | 100 | 116 | 122 | 100 | 141 | 173 |
| HL Y | 99 | 118 | 123 | 118 | 108 | 108 | 110 | 100 | 112 | 122 | | | |
| Elong Brk % X | 100 | 93 | 95 | 88 | 76 | 89 | 84 | 100 | 52 | 38 | 100 | 84 | 74 |
| Elong Brk % Y | 103 | 96 | 98 | 91 | 78 | 92 | 87 | 107 | 78 | 62 | | | |

As the physical characteristics demonstrate in Table 2, the glass microfibers that were pretreated with silane (designated PT in the fiber loading row of Table 2) had the best mix of rigidity, hysteresis and elongation characteristics. While the carbon microfibers provided a good increase in rigidity with minimal impact on hysteresis, the carbon microfibers provided a huge negative impact on the elongation property. Furthermore, while the KEVLAR microfibers provided a good increase in rigidity with minimum impact on elongation, the KEVLAR microfibers provided a huge negative impact on hysteresis. Only the pretreated glass microfibers provided the surprising result of a favorable mix of rigidity, hysteresis and elongation properties.

EXAMPLE 2

This example demonstrates the effectiveness of an elastomer composition that includes very short silane-pretreated glass microfibers used in a sidewall reinforcement member for a run-flat tire. Elastomer formulations were prepared by mixing the components given in Table 3, except for the sulfur and the curing agents, in a banbury mixer operating at 55-65 RPM until a temperature of between 155 and 170° C. was reached. The sulfur and curing agents were then added on a roll mill. Vulcanization was effected at 150° C. for 25 minutes. The formulations were then tested to measure their physical properties. The glass microfiber was pretreated with a silane coupler (TESPT) as previously described.

The compositions of the formulations are shown in Table 3 as the weight percent of elastomer content. Each of the formulations included a mixture of natural rubber and polybutadiene rubber. The materials listed as "other" included antioxidants, antiozonants, plasticizers, sulfur, resins and curing agents such as accelerators, retarders and activators as known to those having ordinary skill in the art. Table 3 further provides the results of the analyses of the physical properties of the formulations.

TABLE 3

Physical Properties of Elastomers with Glass Microfibers (Normalized)

| | | Extruded | | Calendered | |
|---|---|---|---|---|---|
| Formulation | 1 | 2 | 3 | 4 | 5 |
| Microfiber Loading, B-04-F | 0 | 10 | 20 | 10 | 20 |
| Natural Rubber | 80 | 80 | 80 | 80 | 80 |

TABLE 3-continued

Physical Properties of Elastomers with Glass Microfibers (Normalized)

| | | Extruded | | Calendered | |
|---|---|---|---|---|---|
| Formulation | 1 | 2 | 3 | 4 | 5 |
| Polybutadiene Rubber | 20 | 20 | 20 | 20 | 20 |
| Carbon Black | 35 | 35 | 35 | 35 | 35 |
| Silica | 15 | 15 | 15 | 15 | 15 |
| Other | 22.2 | 22.2 | 22.2 | 22.2 | 22.2 |
| Modulus 10% X | 100 | 156 | 241 | 219 | 328 |
| Modulus 10% Y | 100 | 119 | 139 | 118 | 135 |
| Anis X/Y | 1.0 | 1.3 | 1.7 | 1.9 | 2.4 |
| HL X | 100 | 104 | 111 | 117 | 123 |
| HL Y | 96 | 97 | 98 | 105 | 109 |
| Elong Brk % X | 100 | 88 | 83 | 85 | 81 |
| Elong Brk % Y | 91 | 71 | 61 | 68 | 78 |

TABLE 4

Tire Test Results Using Formulations of Table 3 (Normalized)

| Tire Data (255/50/R17) | Formulation | | | | |
|---|---|---|---|---|---|
| | 1 | 2 | 3 | 4 | 5 |
| Inflated Rolling Resistance | 100 | 103 | 104 | 105 | 106 |
| ISO 16992 Run-Flat Endurance | 100 | 106 | 125 | — | 193 |
| On-Vehicle Run-Flat Endurance | 100 | 138 | 153 | — | 119 |

As the physical properties shown in Table 3 demonstrate, the calendered elastomeric composition provided a large increase in modulus while surprisingly maintaining a good mix of hysteresis and elongation characteristics.

Tires were made having dimensions of 255/50/R17. The crescent shaped reinforcing member in the sidewall of the tires was constructed of skim layers (formed by either calendering or extrusion) with the fibers oriented circumferentially. The calendered layers were made of the elastomeric compositions shown in Table 3.

The tires having the crescent shaped reinforcement member were tested for inflated rolling resistance, for run-flat endurance under the ISO Standard 16992 and for on-vehicle run-flat endurance. As the test results shown in Table 4 demonstrate, rolling resistance (a function of hysteresis) advantageously improved by about 3-6% (indicating a decrease in hysteresis) while the run-flat endurance, as tested under the ISO Standard 16992, increased by over 90 percent.

EXAMPLE 3

This example demonstrates the effectiveness of an elastomer composition that includes very short silane-pretreated glass microfibers used in a tread on a truck tire. Elastomer formulations were prepared by kneading the components given in Table 5, except for the sulfur and the curing agents in a banbury mixer operating at 55-65 RPM until a temperature of between 155 and 170° C. was reached. The sulfur and curing agents were then added on a roll mill. Vulcanization was effected at 150° C. for 25 minutes. The formulations were then tested to measure their physical properties. The glass microfiber was pretreated with a silane coupler (TESPT) as previously described.

The compositions of the formulations are shown in Table 5 as the weight percent of elastomer content. One of the groups of formulation included only natural rubber while the second group of formulations included natural rubber, butadiene rubber and styrene-butadiene rubber. The materials listed as "other" included antioxidants, antiozonants, plasticizers, sulfur, resins and curing agents such as accelerators, retarders and activators as known to those having ordinary skill in the art. Table 5 further provides the results of the analyses of the physical properties of the formulation.

TABLE 5

Physical Properties of Elastomers with Glass Microfibers (Normalized)

| Formulation | I | | II | |
|---|---|---|---|---|
| | 1 | 2 | 3 | 4 |
| Microfiber Loading B-00 FST | 0 | 10 | | |
| Microfiber Loading B-04-FST | | | 0 | 10 |
| Natural Rubber | 100 | 100 | 15 | 15 |
| Butadiene Rubber | | | 15 | 15 |
| Styrene-butadiene rubber | | | 70 | 70 |

TABLE 5-continued

Physical Properties of Elastomers with Glass Microfibers (Normalized)

| Formulation | I | | II | |
|---|---|---|---|---|
| | 1 | 2 | 3 | 4 |
| Carbon Black | 45 | 45 | 50 | 50 |
| Silica | | | | |
| TESPT | 0 | 0.5 | 0 | 0.5 |
| Reinforcing Resin | 1.5 | 0 | 0 | 0 |
| Other | 11.4 | 11.4 | 11.4 | 11.4 |
| Modulus 10% X | 100 | 148 | 100 | 177 |
| Modulus 10% Y | 104 | 98 | | 109 |
| Anis X/Y | 1.0 | 1.5 | | 1.6 |
| HL X | 100 | 105 | 100 | 102 |
| HL Y | 104 | 96 | | 100 |
| Elong Brk % X | 100 | 79 | | |
| Elong Brk % Y | 97 | 88 | | |
| Tire Data | | | | |
| Rolling Resistance | | | | |
| Circumferential Orientation | 100 | 102 | 100 | 105 |
| Lateral Orientation | 100 | 106 | | |
| Tread Thickness Orientation | | | 100 | 113 |
| 45 XZ Steer | 100 | 101 | | |

Again, the addition of very short silane-pretreated glass microfibers provided an elastomer composition having a large increase in modulus while still maintaining a good mix of hysteresis and elongation characteristics. Truck tires having dimensions of 275/70R/22.5 were constructed with the tires having treads formed of the elastomeric compositions shown in Table 4. The treads all contained silane pretreated glass microfibers oriented in either the circumferential, lateral, tread thickness or 45° XZ plane (See, FIG. 2) direction.

As the results of the rolling resistance tests shown in Table 4 demonstrate, the rolling resistance performance of the tires actually improved (indicating lower hysteresis). The largest improvement in rolling resistance was demonstrated when the microfibers were arranged in the tread-thickness direction with an improvement of 13%.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A tire, comprising:
 a tread, the tread formed entirely of one elastomer composition, the elastomer composition comprising:
 one or more natural rubbers, one or more synthetic rubbers or combinations thereof; and
 glass microfibers having an average fiber diameter of between 0.2 μm and 1 μm and an average length of between about 5 and 200 μm, wherein the glass microfibers are evenly distributed throughout the elastomer composition and are directionally oriented at substantially +45° in a plane formed between the tread thickness and circumferential orientations.

2. The tire of claim 1, wherein the average length of the glass microfibers is between 5 and 100 μm.

3. The tire of claim 2, wherein the average length of the glass microfibers is between about 10 and 70 μm.

4. The tire of claim 1, wherein a glass microfiber loading is between about 0.5 and 50 pounds per hundred of the elastomer.

5. The tire of claim 4, wherein the glass microfiber loading is between about 2 and 20 pounds per hundred of the elastomer.

6. The tire of claim 1, wherein the average diameter of the microfibers is between about 0.3 and 0.8 μm.

7. The tire of claim 1, wherein the glass microfibers are silane-modified.

8. The elastomer composition of claim 7, wherein the glass microfibers are silane-pretreated.

9. The tire of claim 1, wherein the synthetic rubbers are selected from polybutadicnes, styrene-butadiene rubbers, polyisoprenes or combinations thereof.

10. The tire of claim 9, wherein the glass microfiber loading is between about 2 and 20 pounds per hundred of the elastomer.

11. The tire of claim 10, wherein the glass microfibers are silane-modified.

12. The tire of claim 11, wherein the average diameter of the microfibers is between about 0.3 and 0.8 μm.

13. The tire of claim 12, wherein the average length of the glass microfibers is between about 10 and 70 μm.

14. The tire of claim 1, wherein the elastomer composition includes no synthetic rubber.

15. The tire of claim 14, wherein the glass microfiber loading is between about 2 and 20 pounds per hundred of the elastomer.

16. The tire of claim 15, wherein the glass microfibers are silane-modified.

17. The tire of claim 16, wherein the average diameter of the microfibers is between about 0.3 and 0.8 μm.

18. The tire of claim 17, wherein the average length of the glass microfibers is between about 10 and 70 μm.

* * * * *